United States Patent
Meyer

(10) Patent No.: US 6,351,472 B1
(45) Date of Patent: Feb. 26, 2002

(54) SERIAL BIDIRECTIONAL DATA TRANSMISSION METHOD FOR HEARING DEVICES BY MEANS OF SIGNALS OF DIFFERENT PULSEWIDTHS

(75) Inventor: Wolfram Meyer, Moehrendorf (DE)

(73) Assignee: Siemens Audiologische Technik GmbH, Erlangen (DE)

( * ) Notice: Subject to any disclaimer, the term of this patent is extended or adjusted under 35 U.S.C. 154(b) by 0 days.

(21) Appl. No.: 09/299,760

(22) Filed: Apr. 27, 1999

(30) Foreign Application Priority Data

Apr. 30, 1998 (DE) .......................................... 198 19 509

(51) Int. Cl.[7] .................................................. H04J 3/16
(52) U.S. Cl. ........................................ 370/470; 381/314
(58) Field of Search ................................ 370/282, 438, 370/464, 465, 468, 473, 474; 381/312, 314, 315

(56) References Cited

U.S. PATENT DOCUMENTS

| 4,532,930 A | * | 8/1985 | Crosby et al. ................. 607/57 |
| 5,349,585 A | | 9/1994 | Soukal |
| 5,515,443 A | | 5/1996 | Meyer |
| 5,522,865 A | * | 6/1996 | Schulman et al. ............. 607/56 |
| 5,569,307 A | * | 10/1996 | Schulman et al. ............. 607/56 |
| 6,044,162 A | * | 3/2000 | Mead et al. ................. 381/312 |
| 6,088,339 A | * | 7/2000 | Meyer ........................ 370/296 |
| 6,134,474 A | * | 10/2000 | Fischell et al. ................ 607/45 |

FOREIGN PATENT DOCUMENTS

| DE | OS 38 41 464 | 6/1990 |
| DE | OS 196 51 126 | 6/1998 |
| EP | 0 448 764 | 10/1991 |
| EP | 0 821 502 | 1/1998 |

* cited by examiner

Primary Examiner—David R. Vincent
(74) Attorney, Agent, or Firm—Schiff Hardin & Waite

(57) ABSTRACT

In a serial, bidirectional data transmission method for communication between a programming device and a service device which is to be programmed, such as a hearing device, data are transmitted from the programming device and clock pulses are transmitted to the service device for individual adjustment of the application-specific data of the service device. Using a single signaling line, clock pulses that are variably formed for data transmission, are applied at the signaling line, and the digital information is recovered at the service device side by means of clock pulse variation and is subsequently processed with the transmitted clock pulse. Clock pulsewidth variation is performed as the clock pulse variation.

15 Claims, 1 Drawing Sheet

SERIAL BIDIRECTIONAL DATA TRANSMISSION METHOD FOR HEARING DEVICES BY MEANS OF SIGNALS OF DIFFERENT PULSEWIDTHS

BACKGROUND OF THE INVENTION

1. Field of the Invention

The present invention relates to a serial bidirectional data transmission method for communication between a programming device and a service device which is to be programmed, such as a hearing aid.

2. Description of the Prior Art and Related Application

Serial, bidirectional data transmission is known for communication between a programming device and a hearing aid device, wherein data and clock pulses are transmitted from the programming device to the hearing aid device for individually adjusting auditory environment-specific data, or hearing deficiency-specific data, of the hearing aid device. It is known to accomplish such transmission using a single signaling line for the data transmission, with variable clock pulses being supplied to the signaling line. The digital information is recovered at the hearing aid device by analyzing the variation in the clock pulses. The recovered digital information is subsequently processed with the transmitted clock pulse. It is known to employ clock pulsewidth variation as the clock pulse variation.

German OS 196 51 126, corresponding to co-pending U.S. application Ser. No. 08/984,060, filed Dec. 3, 1997 ("Serial Bidirectional Data Transmission Method and Apparatus and Hearing Aid Employing Same," W. Meyer), assigned to the same Assignee (Siemens AG) as the present application, teaches a serial, bidirectional data transmission method for communication between a programming device and a service device, wherein for data transmission variably formed clock pulses are applied to a signaling line, and the digital information is recovered by means of clock pulse variation. As an example of a clock pulse variation, a clock pulse amplitude variation is suggested, which, however, can be realized only with considerable technical outlay in a realization of a wireless transmission path between a programming device and a service device.

SUMMARY OF THE INVENTION

An object of the present invention is to provide a method for data transmission of the type initially described which is also suitable for wireless data transmission between a programming device and a service device.

The above object is achieved in accordance with the principles of the present invention in a serial, bidirectional data transmission method of the type initially described, wherein a transmission frame with a defined pulsewidth is used, the transmission frame having a start bit which is set to 0 and a stop bit which is set to 1. In the data transmission from the programming device to the hearing aid device, the transmission frame has at least one other bit position, besides the start bit, which is set to 0, this at least one other position being set to 1 in the responsive (answerback) data transmission from the hearing aid device to the programming device. Additionally or alternatively, the responsive data transmission may have at least one other bit position besides the stop bit which is set to 1, this at least one other being positioned being set to 0 in the responsive data transmission from the hearing aid device to the programming device.

Compared to the cited data transmission described in German OS 196 51 126, and U.S. application Ser. No. 08/984,060, the inventive data transmission method enables a simplified data transmission, particularly given the use of a wireless transmission path between a programming device and a service device, since a transmission of different signal amplitude information, which is susceptible to interference, is not used.

The overall disclosure of the aforementioned co-pending U.S. application Ser. No. 08/984,060 is incorporated herein by reference. The inventive data transmission method can be expanded by suitable methodological and/or circuit variants described in U.S. application Ser. No. 08/984,060.

For reasons of cost, a standardized serial interface, particularly an RS232 interface, is utilized in the inventive method.

For simpler processing of the clock pulse information, a transmission frame with a defined pulsewidth (particularly 8 bit positions) is advantageously used.

The start of a transmission frame is specified by a start bit that is set at 0, thereby generating the chronological zero point of the transmission frame and making it possible to forgo a separate clock line. The end of a transmission frame can be indicated by a stop bit that is set at 1.

Within the transmission frame, only a certain number of neighboring bit positions are set at 0, and the remaining bit positions are set at 1, so that a pulsewidth signal with an assigned significance is produced. By changing the number of neighboring bit positions that are set at 0 or 1, respectively, different significance assignments can be coded within a transmission frame.

In another variant of the method, in the data transmission from a programming device to a service device, the transmission frame has at least one other bit position (besides the start bit) which is set to 0, or has at least one other bit position (besides the stop bit) which is set to 1. In the transmission back from the service device to the programming device, response information can be inserted in the transmission frame at this additional location. A transmission frame such as TXD and RXD frame is used.

A known interface can be connected between the programming device and the service device, particularly the hearing device, by which interface a voltage level matching between the interface of the programming device and the hearing device can occur, for example. Furthermore, increased programming voltages (e.g. 15V) and answerback signals can be generated via the interface. In addition, in programming of a hearing device which is a dual device, a changeover between the left and the right hearing aids can occur via the interface.

DESCRIPTION OF THE PREFERRED EMBODIMENTS

Figure 1:
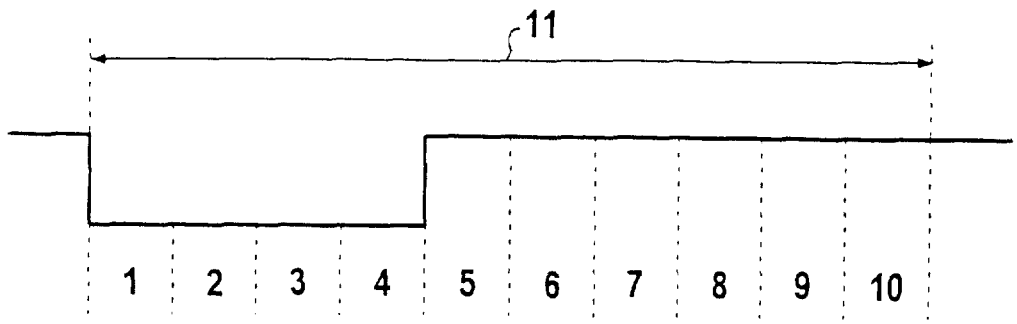
FIG. 1 illustrates a transmission frame with a first significance assignment in accordance with the inventive method.
Figure 2:
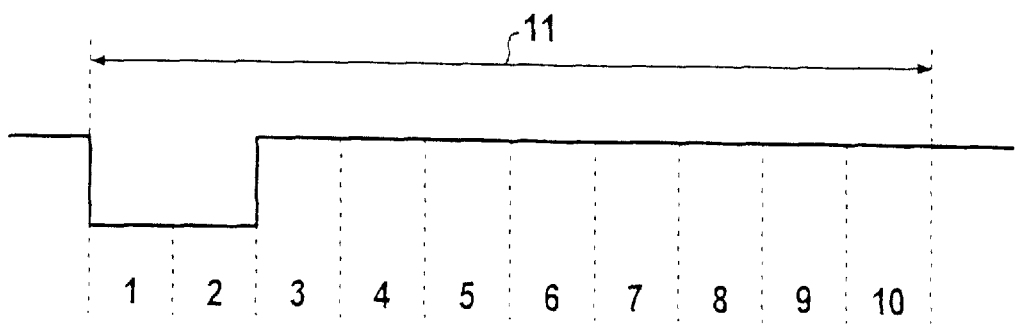
FIG. 2 illustrates a transmission frame with an additional significance assignment in accordance with the inventive method.

FIG. 1 and FIG. 2 depict a transmission frame 11 which has a width of 10 bit positions 1–10. In the transmission frame 11 according to FIG. 1, in a data transmission from a programming device to a service device, the bit positions 1–4 are set at 0, and the bit positions 5–10 are set at 1, so that a specific significance assignment is produced.

Bit position 1 is set at 0, so that a 1/0 transition arises at the beginning of the transmission frame 11, and bit position 1 thus serves as start bit. Bit position 10 is set at 1 and serves as stop bit. The bit positions 2–9 are set at 0 or 1 with respective significance assignments.

In the transmission frame 11 according to FIG. 2, which can serve as an example of a response by the service device to the programming device, the bit positions 3 and 4 have been set (charged) from 0 to 1, as compared to FIG. 1. The response information of the hearing device to the programming device thus has been inserted into the transmission frame of the response at the bit positions 3 and 4.

Although modifications and changes may be suggested by those skilled in the art, it is the intention of the inventor to embody within the patent warranted hereon all changes and modifications as reasonably and properly come within the scope of his contribution to the art.

I claim as my invention:

1. In a serial, bidirectional data transmission method for communicating between a programming device and a hearing aid device, wherein digital data and clock pulses of respectively variable pulse widths are transmitted, via a single signaling line, from the programming device to the hearing aid device for adjusting operating parameters of the hearing device, and wherein said digital data are recovered at the hearing aid device by analyzing the variations of said pulsewidths of said clock pulses, and wherein said hearing aid device, upon recovery of said digital data, transmits a responsive transmission of digital data from said hearing aid device to said programming device, the improvement comprising:

transmitting said digital data between said programming device and said hearing aid device in a transmission frame with a defined pulsewidth and having a start bit which is set to 0 and a stop bit which is set to 1;

for transmission of said digital data in said transmission frame from said programming device to said hearing aid device, setting at least one bit position besides said start bit to 0; and in said responsive transmission of said digital data from said hearing aid device to said programming device, setting said at least one bit position to 1.

2. The improvement of claim 1 comprising transmitting said digital data between said programming device and said hearing aid device via a standardized serial interface.

3. The improvement of claim 2 comprising the step of employing an RS232 interface as said standardized serial interface.

4. The improvement of claim 1 comprising employing a transmission frame comprising 10 bit positions as said transmission frame for transmitting said digital data between said programming device and said hearing aid device.

5. A method as claimed in claim 1 comprising employing a TXD frame as said transmission frame for transmitting said digital data from said programming device to said hearing aid device, and using an RXD frame as said transmission frame for transmitting said digital data from said hearing aid device to said programming device.

6. In a serial, bidirectional data transmission method for communicating between a programming device and a hearing aid device, wherein digital data and clock pulses of respectively variable pulse widths are transmitted, via a single signaling line, from the programming device to the hearing aid device for adjusting operating parameters of the hearing device, and wherein said digital data are recovered at the hearing aid device by analyzing the variations of said pulsewidths of said clock pulses, and wherein said hearing aid device, upon recovery of said digital data, transmits a responsive transmission of digital data from said hearing aid device to said programming device, the improvement comprising:

transmitting said digital data between said programming device and said hearing aid device in a transmission frame with a defined pulsewidth and having a start bit which is set to 0 and a stop bit which is set to 1;

for transmission of said digital data in said transmission frame from said programming device to said hearing aid device, setting at least one bit position besides said stop bit to 1; and in said responsive transmission of said digital data from said hearing aid device to said programming device, setting said at least one bit position to 0.

7. The improvement of claim 6 comprising transmitting said digital data between said programming device and said hearing aid device via a standardized serial interface.

8. The improvement of claim 7 comprising the step of employing an RS232 interface as said standardized serial interface.

9. The improvement of claim 6 comprising employing a transmission frame comprising 10 bit positions as said transmission frame for transmitting said digital data between said programming device and said hearing aid device.

10. A method as claimed in claim 6 comprising employing a TXD frame as said transmission frame for transmitting said digital data from said programming device to said hearing aid device, and using an RXD frame as said transmission frame for transmitting said digital data from said hearing aid device to said programming device.

11. In a serial, bidirectional data transmission method for communicating between a programming device and a hearing aid device, wherein digital data and clock pulses of respectively variable pulse widths are transmitted, via a single signaling line, from the programming device to the hearing aid device for adjusting operating parameters of the hearing device, and wherein said digital data are recovered at the hearing aid device by analyzing the variations of said pulsewidths of said clock pulses, and wherein said hearing aid device, upon recovery of said digital data, transmits a responsive transmission of digital data from said hearing aid device to said programming device, the improvement comprising:

transmitting said digital data between said programming device and said hearing aid device in a transmission frame with a defined pulsewidth and having a start bit which is set to 0 and a stop bit which is set to 1;

for transmission of said digital data in said transmission frame from said programming device to said hearing aid device, setting at least one first bit position besides said start bit to 0 and setting at least one second bit position besides said stop bit to 1; and in said responsive transmission of said digital data from said hearing aid device to said programming device, setting said at least one first bit position to 1 and setting said at least one second bit position to 0.

12. The improvement of claim 11 comprising transmitting said digital data between said programming device and said hearing aid device via a standardized serial interface.

13. The improvement of claim 12 comprising the step of employing an RS232 interface as said standardized serial interface.

14. The improvement of claim 11 comprising employing a transmission frame comprising 10 bit positions as said transmission frame for transmitting said digital data between said programming device and said hearing aid device.

15. A method as claimed in claim 11 comprising employing a TXD frame as said transmission frame for transmitting said digital data from said programming device to said hearing aid device, and using an RXD frame as said transmission frame for transmitting said digital data from said hearing aid device to said programming device.

* * * * *